(No Model.)
P. PATTERSON.
APPARATUS FOR WELDING TUBING.
No. 444,569. Patented Jan. 13, 1891.
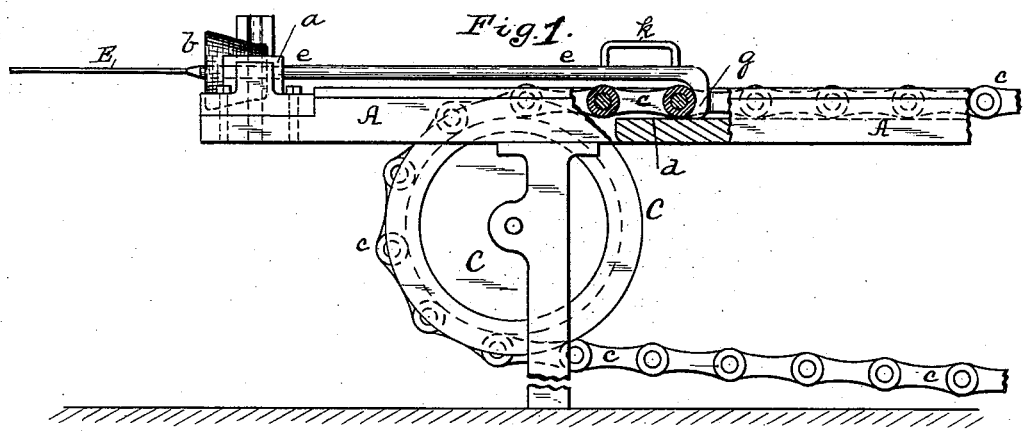
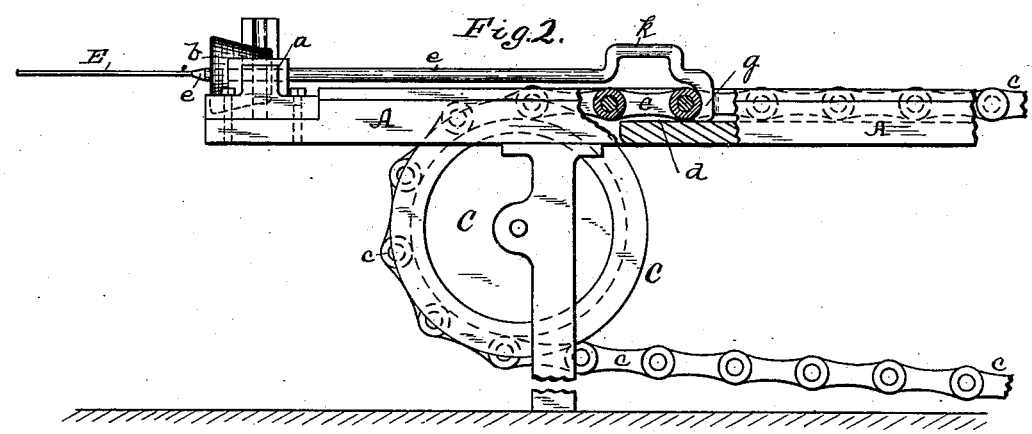
Witnesses:
J. A. Cosley
Robt. D. Totten
Inventor:
Peter Patterson
By James D. Ray
Attorney

UNITED STATES PATENT OFFICE.

PETER PATTERSON, OF McKEESPORT, PENNSYLVANIA, ASSIGNOR TO THE NATIONAL TUBE WORKS COMPANY, OF SAME PLACE.

APPARATUS FOR WELDING TUBING.

SPECIFICATION forming part of Letters Patent No. 444,569, dated January 13, 1891.

Application filed July 5, 1890. Serial No. 357,805. (No model.)

*To all whom it may concern:*

Be it known that I, PETER PATTERSON, a resident of McKeesport, in the county of Allegheny and State of Pennsylvania, have invented a new and useful Improvement in Apparatus for Welding Tubing; and I do hereby declare the following to be a full, clear, and exact description thereof.

My invention relates to apparatus for drawing and welding tubing, its object being to improve the apparatus heretofore employed for this purpose, in which the plate or skelp is drawn through a die or bell in order to bend or bend and weld the same, such apparatus being well illustrated in Letters Patent No. 341,162, granted to me the 4th day of May, 1886. The usual form of apparatus for bending or bending and welding this tubing has consisted in a draw-bench having the bending-die or bell-holder mounted at the forward end, a traveling chain mounted in suitable sprockets and pulleys and traveling longitudinally within the bench, and a buggy running on tracks on the draw-bench and having tongs or like devices which engage the plate or blank, or with the drawing rod or tag secured thereto, and which buggy was provided with a hook which engaged with the chain, so drawing the blank through the bending or welding die. The principal objection found in connection with this way of making tubing was that it required a boy to move the buggy along the draw-bench, engaging it with and disengaging it from the chain and bringing it back to the forward end thereof, this being rather difficult work, requiring considerable skill.

The object of my invention is to overcome the necessity of this buggy by providing the drawing rod or tag with a hook integral with and depending from the tag, which hook can engage with the drawing-chain and so act to draw the blank through the bending or welding die and hold it in engagement with the chain until the skelp or blank is drawn entirely through the die, when the hook can be easily disengaged from the chain.

The particular improvements embodied in my invention will be hereinafter more specifically described and claimed.

To enable others skilled in the art to make and use my invention, I will describe the same more fully, referring to the accompanying drawings, in which—

Figures 1 and 2 are side views of a welding-bench, showing two different forms of the apparatus embodying my invention.

Like letters of reference indicate like parts in each.

The draw-bench A is of the ordinary or any approved construction, having at its forward end, in the apparatus illustrated, the bell-holder $a$, in which the welding-bell $b$ is held, though the apparatus is well adapted to the bending of plates into skelp form, in which case a skelping-die will be located at the forward end of the draw-bench. The drawing-chain $c$ is mounted on the sprocket or pulley C, and travels longitudinally in the ordinary guideway $d$ in the body portion of the draw-bench in position to be engaged, as hereinafter described, by the drawing-tag.

The furnace is of any approved construction, while the plate E, which is to be either bent into skelp form or into tubing, is of the proper width, weight, and size corresponding to the bending or welding die, and has secured thereto by welding or otherwise the drawing-tag $e$. The drawing-tag is provided with a hook formed integral therewith, the hook $g$ being bent from the body of the tag at the rear end thereof, so that the bending or welding bell may be passed over the tag and secured within the bell-holder and the hook of the tag then engaged with the drawing-chain. For this purpose it is evident that the drawing-tag must be of such shape as will permit the welding-bell to be passed over the hook portion thereof, and where the drawing-tag is provided with a handle for operating the same, as shown at $h$, it is evident that the handle must be of such size and shape as to permit the bending or welding bell to be passed over the handle formed on the tag. In Fig. 1 this handle is shown formed of a metal loop secured to the body of the tag, and in such case the opening through the bell must be of sufficient size to pass over the body of the tag and handle, such tag being employed with the larger sizes of bells.

In Fig. 2 the handle $k$ is formed by bending the body of the drawing-tag, so raising from the body itself a portion which can be grasped by the operator in handling the tag and which will raise his hand sufficiently above the body of the tag to prevent contact between the hand and the drawing-chain. Such form of tag can be employed with smaller sizes of welding-bells.

The above-described forms of tags are intended to illustrate forms in which my invention may be embodied, though any suitable form of tag having the essential features of a hook integral with and extending down from the tag itself is included within the invention.

In the use of my invention the drawing-tags are secured to the plates or skelps, as above stated, and the plates inserted within the furnace, and when the plate is brought to the proper heat the tag is connected to the drawing-chain by the hook $g$, extending down from the same, the hook of the tag thus forming the connection between the plate to be bent or bent and welded and the drawing-chain. After the plate is inserted within the furnace the operator takes the welding-bell and passes the same around the hooked end of the drawing-tag and over the body of the same and into position to be caught by the bell-holder $a$. When the plate is brought to the proper heat, he then simply forces the hooked end of the drawing-tag into engagement with the drawing-chain, so that the chain will draw the plate or skelp through the bending or welding die. When the plate has been drawn entirely through the die and the tag reaches the rear end of the draw-bench, it can be quickly released from the drawing-chain and the tag separated from the tube and skelp.

The drawing-tags having the hooks formed integral therewith can, after the operation above described, be secured to other plates and used again in the manner above described.

It is thus evident that by my invention I do away entirely with the necessity of a separate boy or operator to move the buggy and so reduce the amount of labor necessary in the operation of bending and welding tubing and greatly simplify the operation, bringing all the work under the control of the welder or main operator at the furnace.

What I claim as my invention, and desire to secure by Letters Patent, is—

1. A drawing-tag secured to a tube skelp or blank and having a hook formed integral therewith and depending therefrom and adapted to engage with the drawing-chain, substantially as and for the purposes set forth.

2. A drawing-tag secured to a tube skelp or blank and having a hook formed integral therewith and depending therefrom and having the body of the tag bent to form a handle therefor, substantially as and for the purposes set forth.

In testimony whereof I, the said PETER PATTERSON, have hereunto set my hand.

PETER PATTERSON.

Witnesses:
CHARLES PATTERSON,
H. R. MAZURIE.